(No Model.)

G. CODE.
HYDRAULIC ENGINE.

No. 249,900. Patented Nov. 22, 1881.

WITNESSES
Alexander Graham
John D. Evans

INVENTOR
George Code

UNITED STATES PATENT OFFICE.

GEORGE CODE, OF BELLEVILLE, ONTARIO, CANADA.

HYDRAULIC ENGINE.

SPECIFICATION forming part of Letters Patent No. 249,900, dated November 22, 1881.

Application filed August 4, 1881. (No model.)

*To all whom it may concern:*

Be it known that I, GEORGE CODE, of the city of Belleville, in the county of Hastings, Province of Ontario, and Dominion of Canada, have invented certain Improvements in Hydraulic Engines, of which the following is a specification.

My invention consists of a hydraulic balance motive power which is composed of a number of pipes or reservoirs in pairs. These pipes are provided with cylinders, pistons, and connecting-rods, and when filled with water and set in motion have a vertical oscillating motion on a shaft. Within the circumference of this shaft, and with the same center, is another shaft, with which is connected the crank for the connecting-rods, and also carries the balance-wheel. This latter shaft of each pair of pipes are connected by means of pinions.

The object of my invention is to provide a hydraulic engine which will be perfectly balanced and requiring very little power to set in motion, but when set in motion exerting a very largely increased ratio of power.

Figure 1:
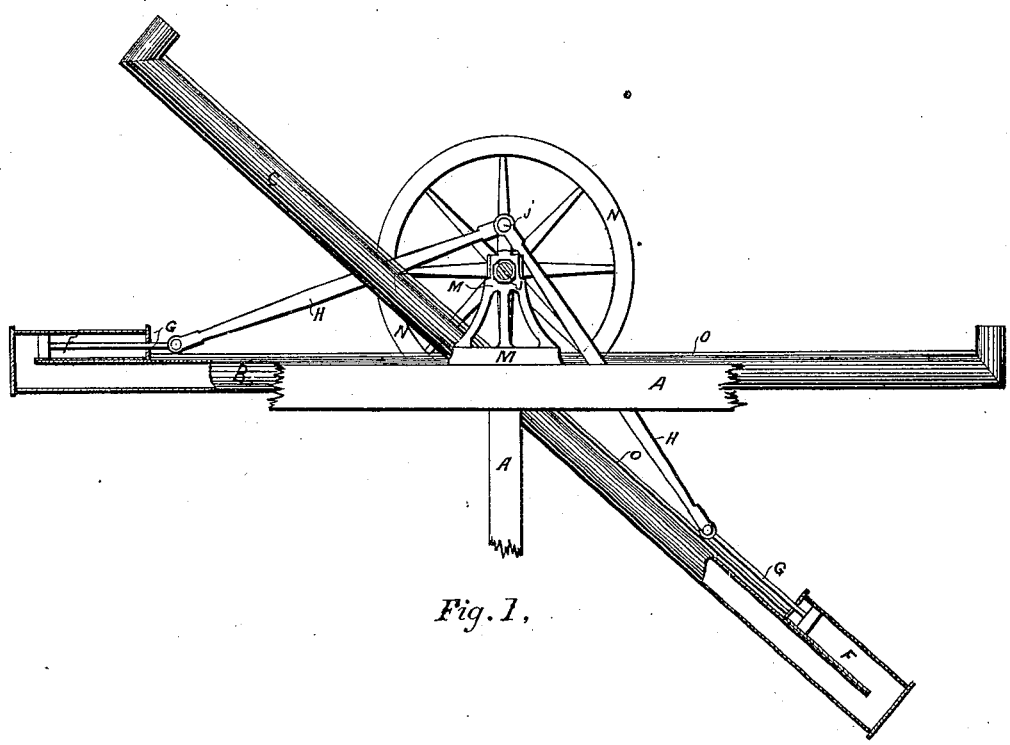
Figure 2:
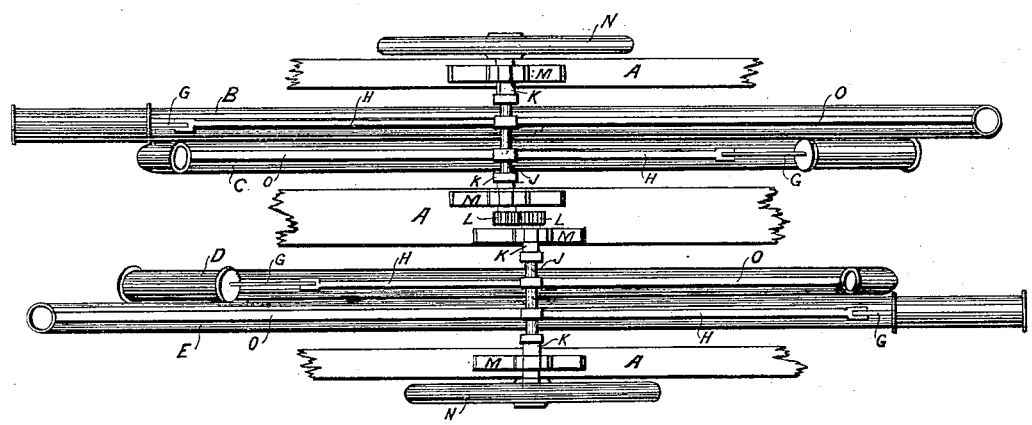

Figure 1 is a side view of one pair of pipes, having the cylinders in section, embodying my invention. Fig. 2 is a plan showing two pairs of pipes connected.

A is the frame of the machine. B, C, D, and E are pipes or reservoirs, connected rigidly together in pairs, as B and C and D and E, at or near the center point of their length, and at any angle which may prove most desirable, and suspended from the frame A by the shaft K, and said shaft being boxed into the journal M, and upon which shaft the pipes have a vertical oscillating motion, their center of motion being at a point above their place of connection, thereby tending to keep them more evenly balanced when in motion. These pipes are provided with cylinders F at one end, and are turned up and open at the other, and these cylinders are at the reverse ends in each pair of pipes, the pipes being filled with water, or any other suitable fluid, to such an extent that when they are in a horizontal position the main length of pipe is just full and the cylinder empty. On this pipe B being depressed at the cylinder end, the water runs down and fills up the cylinder, thereby forcing the piston-head G backward. At the same time that this operation is going on the cylinder on the pipe C is rising, and pressure of water therefore lessening, and the piston-head G therefore moves forward, owing to the connecting-rods H of both piston-heads being attached to the same crank J'. Thus the alternate rising and falling of the cylinder ends of the pipes causes, through the interposition of the piston head, connecting-rod, and crank, the shaft J to revolve. On this shaft J is placed the balance-wheel N, from which motion can be obtained in any manner which may prove most convenient for the purpose.

O is a pipe connecting the cylinder-head with the upturned end of the pipe to permit any water which may escape through the piston-head to return back to the pipe, and also for the escape of air from the back of the piston-head while it is being forced back by the weight of the water.

L are pinions on the end of the shaft J, which pinions mesh into one another, and so prevent one shaft from revolving without the other revolving in the opposite direction. The object of this is to still further carry out the plan of a perfectly balanced machine by introducing two or more pairs of pipes and connecting them thus with pinions, and each pair of pipes having a balance-wheel to regulate their own strokes.

I claim as my invention—

The combination of the pipes B, C, D, and E with the cylinder F, piston-head G, connecting-rod H, crank J', shafts J and K, pinions L, balance-wheel N, and pipe O, substantially as and for the purpose hereinbefore set forth.

GEORGE CODE.

Witnesses:
ALEXANDER GRAHAM,
JOHN D. EVANS.